United States Patent
Kudo (10) Patent No.: US 7,232,142 B2
(45) Date of Patent: Jun. 19, 2007

(54) VEHICLE BODY STRUCTURE FOR MOTORCYCLE

(75) Inventor: Takashi Kudo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/947,319

(22) Filed: Sep. 23, 2004

(65) Prior Publication Data
US 2005/0103548 A1    May 19, 2005

(30) Foreign Application Priority Data
Sep. 30, 2003  (JP)  ............................. 2003-342524

(51) Int. Cl.
*B62K 19/06*  (2006.01)
(52) U.S. Cl. .................... 280/274; 280/281.1; 180/219
(58) Field of Classification Search ................ 280/781, 280/798, 281.1, 274; 180/219, 312
See application file for complete search history.

(56) References Cited

U.S. PATENT DOCUMENTS

| | | | | |
|---|---|---|---|---|
| 4,226,296 A | * | 10/1980 | Higaki | 180/219 |
| 4,469,189 A | * | 9/1984 | Minami et al. | 180/219 |
| 4,550,794 A | * | 11/1985 | Inoue et al. | 180/219 |
| 4,706,774 A | * | 11/1987 | Tsuboi | 180/227 |
| 4,727,953 A | * | 3/1988 | Kudo et al. | 180/219 |
| 4,742,884 A | * | 5/1988 | Ishikawa | 180/219 |
| 4,765,431 A | * | 8/1988 | Yoshioka | 180/219 |
| 5,375,677 A | * | 12/1994 | Yamagiwa et al. | 180/219 |
| 5,704,442 A | * | 1/1998 | Okazaki et al. | 180/219 |
| 6,073,719 A | | 6/2000 | Ohmika et al. | |
| 6,182,994 B1 | * | 2/2001 | Gogo et al. | 280/284 |
| 6,290,017 B1 | * | 9/2001 | Ito | 180/227 |
| 6,332,505 B1 | * | 12/2001 | Tateshima et al. | 180/229 |
| 2003/0062740 A1 | * | 4/2003 | Takemura et al. | 296/78.1 |

FOREIGN PATENT DOCUMENTS

| | | |
|---|---|---|
| EP | 1 138 588 A2 | 10/2001 |
| EP | 1138588 A2 * | 10/2001 |
| JP | 2-38195 A | 2/1990 |
| JP | 3-118287 A | 5/1991 |
| JP | 03118287 A * | 5/1991 |
| JP | 9-95278 A | 4/1997 |

* cited by examiner

*Primary Examiner*—Lesley D. Morris
*Assistant Examiner*—Daniel Yeagley
(74) *Attorney, Agent, or Firm*—Birch, Stewart, Kolasch & Birch, LLP (57) ABSTRACT

To maintain the width of a vehicle body structure for a motorcycle wherein the rigidity of a vehicle body may be increased without increasing the width of the vehicle. Alternatively, to enable to restrain an increase in the weight of the vehicle body by realizing a vehicle body structure for a motorcycle in which the problem wherein the weight of the vehicle body increases when the rigidity of the vehicle body is increased. In a motorcycle including main pipes extending rearwardly from a head pipe, a pair of left and right down tubes are provided that extend from the head pipe obliquely downwardly. The down tubes are formed to be tapered from the head pipe toward an engine when viewed from the side of the vehicle body and to be constant in width from the head pipe toward the engine when viewed from the front of the vehicle body.

24 Claims, 8 Drawing Sheets

PRIOR ART

VEHICLE BODY STRUCTURE FOR MOTORCYCLE

CROSS-REFERENCE TO RELATED APPLICATIONS

The present application claims priority under 35 USC 119 to Japanese Patent Application No. 2003-342524 filed on Sep. 30, 2003 the entire contents of which are hereby incorporated by reference.

BACKGROUND OF THE INVENTION

1. Field of the Invention

The present invention relates to a vehicle body structure for a motorcycle which can improve the rigidity of a vehicle body without increasing the width or the weight of the vehicle body.

2. Description of Background Art

A vehicle body structure for a motorcycle is known wherein main pipes extend rearwardly from a head pipe with a pair of left and right down tubes extending from the head pipe obliquely downwardly toward the rear and with an engine disposed between the main pipes and down tubes.

In this vehicle body structure of a motorcycle, front hangers are attached to the extremities of the pair of left and right down tubes and a rear hanger is mounted adjacent to the main pipes for supporting the engine.

A vehicle body structure for a motorcycle as described above is disclosed in JP-A-9-95278 wherein the vehicle width of the motorcycle is reduced by providing the front hangers formed of a plate member at the extremities of the down tubes.

Figure 8:
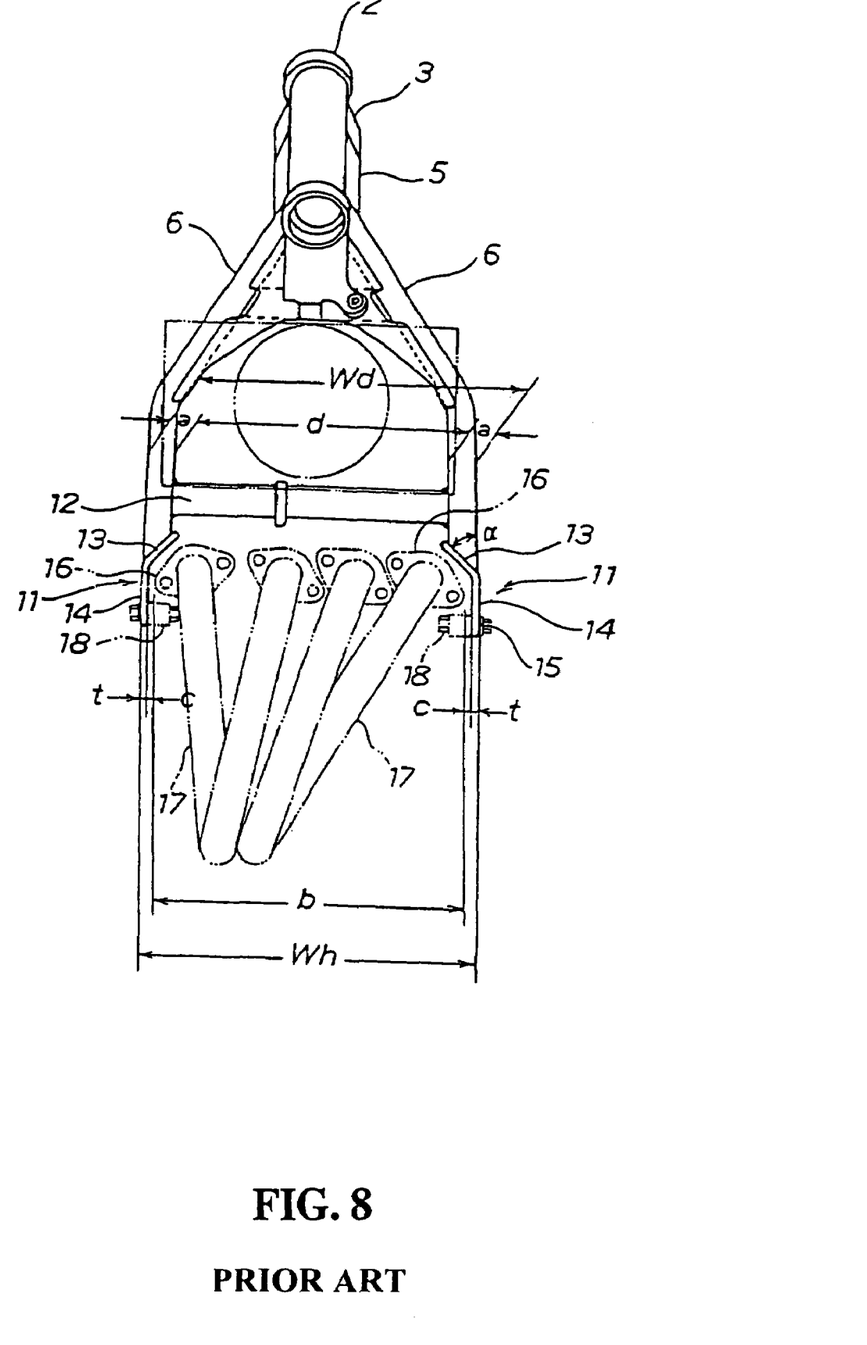
FIG. 8 is a drawing corresponding to FIG. 2 of JP-A-9-95278.

FIG. 8 is a drawing that corresponds to FIG. 2 in JP-A-9-95278, wherein the reference numerals have been changed as compared to the reference numerals as used in JP-A-9-95278.

A vehicle body structure for a motorcycle in JP-A-9-95278 includes main pipes 3 extending from a head pipe 2 rearwardly with a pair of left and right down tubes 6, 6 extending from the head pipe 2 obliquely downwardly towards the rear. Plate shaped front hangers 11, 11 are attached to the extremities of the down tubes 6, 6 with an engine (not shown) being supported by the front hangers 11, 11 and the main pipes 3. Four exhaust pipes 17 . . . extend from the engine ( . . . represents that there are a plurality of members, hereinafter) and pass insides the down tubes 6, 6.

However, the vehicle body structure for a motorcycle in JP-A-9-95278 has a problem in that when the diameters of the down tubes 6, 6 are increased for improving the rigidity of the vehicle body. The exhaust pipes 17 . . . extending from cylinders of the engine respectively tend to interfere with the down tubes 6, 6, whereby the width of the motorcycle is obliged to be increased in order to eliminate this interference.

In addition, the vehicle body structure for a motorcycle in JP-A-9-95278 has a problem in that, for example, the weight of the vehicle body increases when attaching reinforcing members are added to the down tubes 6, 6 for improving the rigidity of the vehicle body, whereby the weight of the vehicle body cannot be maintained.

SUMMARY AND OBJECTS OF THE INVENTION

It is desired to provide a vehicle body structure for a motorcycle in which the rigidity of the vehicle body of the motorcycle can be improved without increasing the width of the vehicle. Thus, the rigidity of the vehicle body of the motorcycle can be improved without increasing the weight of the vehicle body is desired.

Accordingly, it is an object of the present invention to provide a vehicle body structure for a motorcycle in which the problem of increase the width of the vehicle in association with an improvement in the rigidity of the vehicle body of a motorcycle is solved. Thus, the width of the vehicle may be maintained. In addition, a vehicle body structure for a motorcycle is provided in which the problem of increasing the weight of the vehicle in association with an improvement in the rigidity of the vehicle body of a motorcycle is solved. Thus, an increase in the weight of the vehicle is restrained.

The present invention provides a vehicle body structure for a motorcycle including main pipes extending from a head pipe rearwardly with a pair of left and right down tubes extending from the head pipe obliquely downwardly. An engine is supported by the extremities of the down tubes and the main pipes. A plurality of exhaust pipes extend from the engine wherein the down tube is formed to be tapered from the head pipe towards the engine when viewed from the side of the vehicle body. In addition, the down tube is constant in width from the head pipe to the engine when viewed from the front of the vehicle body.

For example, if the rigidity of the vehicle body of a motorcycle can be improved without increasing the width of the vehicle, and if rigidity of the vehicle body for a motorcycle can be improved without increasing the weight of the vehicle body, it is preferable since the width or the weight of the motorcycle can be improved.

Therefore, the down tubes are formed so as to be tapered from the head pipe toward the engine when viewed from the side of the vehicle body and to be constant in width from the head pipe to the engine when viewed from the front of the vehicle body.

In other words, by forming the down tubes so as to be tapered from the head pipe toward the engine when viewed from the side of the vehicle body and to be constant in width from the head pipe to the engine when viewed from the front of the vehicle body, the rigidity of the vehicle body in the longitudinal direction may be improved without increasing the width of the vehicle and without increasing the weight of the vehicle body.

The present invention provides a plurality of exhaust pipes that are disposed respectively inside and outside the left and right down tubes when viewed from the front of the vehicle body.

By arranging the plurality of exhaust pipes inside and outside the left and right down tubes when viewed from the front of the vehicle body an increase in the dimension of the vehicle body in the direction of the width of the vehicle is restrained. Thus, the layout of the exhaust pipes is facilitated.

The present invention provides down tubes that include joint members for mounting the engine separately that are formed at the extremities thereof. The joint members include mounting seat portions for mounting the engine with the mounting seat portions being formed on the down tubes on the planes widthwise and inside the vehicle so as to be substantially flush therewith. Through-holes are provided for allowing bolts for fixing the engine to pass therethrough by being formed on the mounting seat portions. Substantially cylindrical shaped protecting members are provided for surrounding the bolts by extending outwardly from the mounting seat portions in the direction widthwise of the vehicle.

Since the joint members include the mounting seat portions for mounting the engine formed widthwise and inside the down tubes on planes that are substantially flush therewith, the through-holes for allowing the bolts for fixing the engine to pass therethrough are formed on the mounting seat portions and the substantially cylindrical shaped protecting members surround the bolts by extending widthwise and outwardly from the mounting seat portions. Thus, a projection of the bolts widthwise of the vehicle may be prevented and the bolts are covered by the substantially cylindrical shaped protecting members.

The present invention provides down tubes including larger diameter portions which are increased in diameter by applying pressure from the inside and smaller diameter portions which are reduced in diameter by applying negative pressure.

Since the down tubes include the larger diameter portions which are increased in diameter by applying pressure from the inside and smaller diameter portions are reduced in diameter by applying negative pressure, the down tubes are formed in relatively uniform thickness.

The present invention provides a part of the main pipes and/or the down tubes that is/are formed integrally with the head pipe.

By forming part of the main pipes and/or the down tubes integrally with the head pipe, an improvement in the workability in welding the main pipes and/or the down tubes with respect to the head pipe is achieved.

In the present invention, since the down tube is formed to be tapered from the head pipe toward the engine when viewed from the side of the vehicle body, and to be constant in width from the head pipe to the engine when viewed from the front of the vehicle body, the rigidity of the vehicle body in the longitudinal direction may be improved advantageously without increasing the width of the vehicle and without increasing the weight of the vehicle body.

In the present invention, since the plurality of exhaust pipes are disposed respectively inside and outside the left and right down tubes when viewed from the front of the vehicle body, an increase in the dimension of the vehicle body in the direction of the width of the vehicle is restrained and the layout of the exhaust pipes is facilitated. Consequently, the flexibility of the layout of the exhaust pipes is advantageously increased.

In the present invention, the down tubes include joint members for mounting the engine separately that formed at the extremities thereof. The joint members include mounting seat portions for mounting the engine formed widthwise inside the down tubes on planes substantially flush therewith. Through-holes are provided for allowing bolts for fixing the engine to pass therethrough by being formed on the mounting seat portions. Substantially cylindrical shaped protecting members are provided for surrounding the bolts by extending outwardly from the mounting seat portions in the direction widthwise of the vehicle. The projection of the bolts widthwise of the vehicle may be prevented and the bolts are covered by the substantially cylindrical shaped protecting members. Consequently, an improvement in the appearance of the motorcycle is advantageously achieved.

In the present invention, since the down tubes include the larger diameter portions which are increased in diameter by applying pressure from the inside and smaller diameter portions which are reduced in diameter by applying negative pressure, the down tubes are formed in relatively uniform thickness.

In the present invention provides, since part of the main pipes and/or the down tubes is/are formed integrally with the head pipe, the workability in welding of the main pipes and/or the down tubes with respect to the head pipe may be advantageously improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, a best mode for carrying out the invention will be described.

Figure 1:
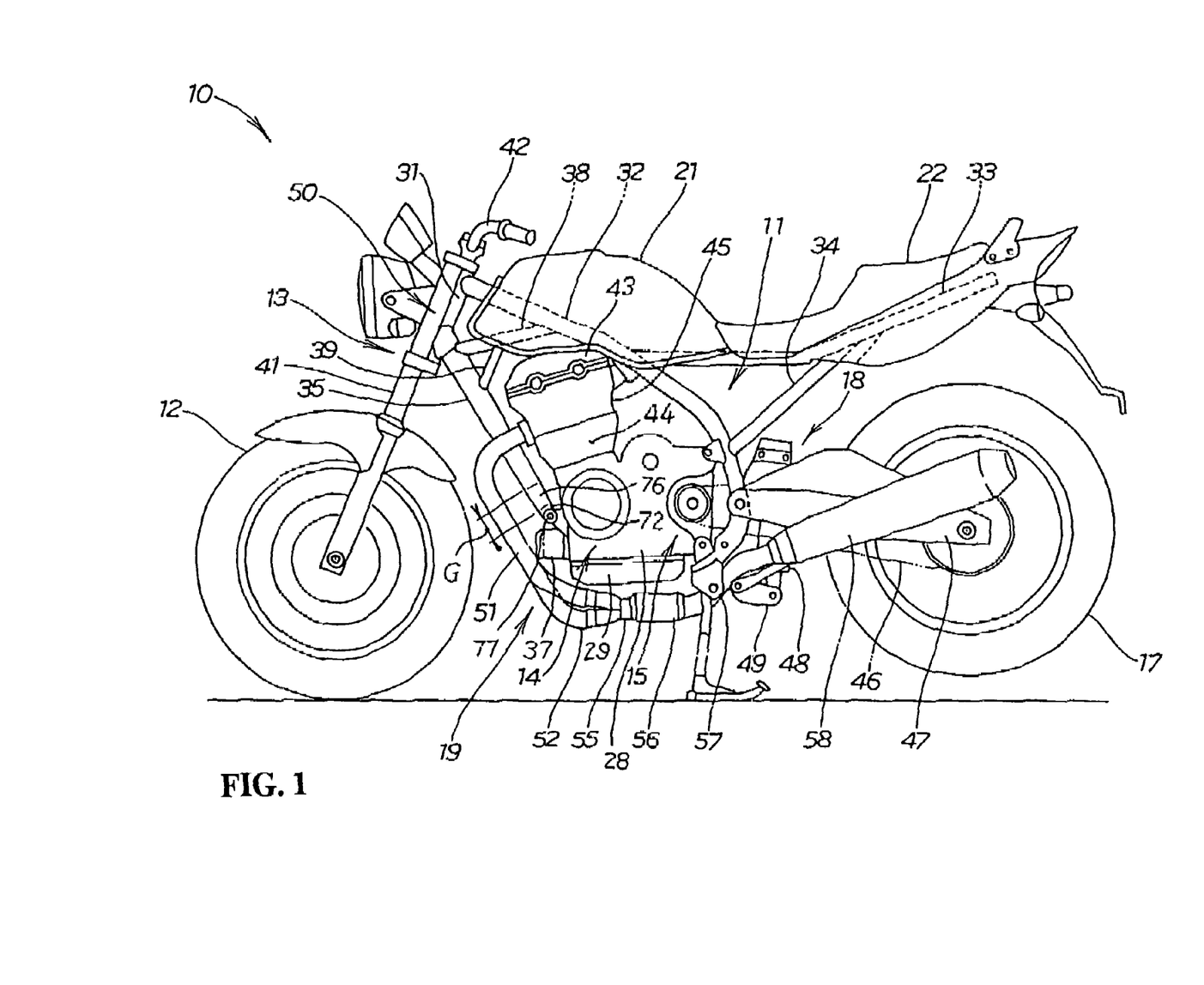
FIG. 1 is a side view of a motorcycle in which a vehicle body structure of the present invention is employed.

FIG. 1 is a side view of a motorcycle in which a vehicle body structure of the present invention is employed. A motorcycle 10 includes a vehicle body frame 11 as a framework. A front wheel suspending and steering mechanism 13 is mounted for steering and suspends a front wheel 12 at the front of the vehicle body frame 11. A water-cooled engine 14 and a transmission 15 are mounted substantially at the center of the vehicle body frame 11 with a rear suspending unit 18 mounted for suspending a rear wheel 17 at the lower rear portion of the vehicle body frame 11. An exhaust unit 19 is connected to the engine 14 for discharging exhaust gas from the engine 14 in a purified state. A fuel tank 21 and a seat 22 are mounted on top of the vehicle body frame 11.

The vehicle body frame 11 includes a head pipe 31 provided at the front end thereof. A pair of left and right main pipes or main frames 32, 32 (only the numeral 32 on the near side is shown) extend from the upper portion of the head pipe 31 obliquely downwardly towards the rear. A pair of left and right seat rails 33, 33 (only the numeral 33 on the near side is shown) extend substantially from the centers of the main pipes 32, 32 rearwardly. A pair of left and right sub frames 34, 34 (only the numeral 34 on the near side is shown) extend between the rear ends of the seat rails 33, 33 and the main pipes 32, 32 respectively. A pair of left and right down tubes 35, 36 (only the numeral 35 on the near side is shown) extend from the lower portion of the head pipe 31 obliquely downwardly towards the rear and then extend further towards the rear to connect the lower portions of the main pipes 32, 32.

A reinforcing frame 38 extends between the main pipes 32 and the down tube 35. An auxiliary stay 39 is provided between the down tube 35 and the reinforcing frame 38.

The front wheel suspending and steering mechanism 13 includes a front fork 41 steerably mounted to the head pipe 31 with a bar handle 42 attached to the upper end of the front fork 41. The front wheel 12 is attached to the lower end of the font fork 41.

The engine 14 and the transmission 15 constitute a integrally formed power unit with the power unit being attached to the main pipes 32, 32 and the down tubes 35, 36.

The engine 14 is configured by extending the exhaust unit 19 from a cylinder head 45 downwardly and rearwardly. The transmission 15 transmits power to the rear wheel 17 via a chain 46.

The rear suspending unit 18 includes swing arms 47 swingably mounted to the lower rear portion of the main pipes 32, 32 (only the numeral 32 on the near side is shown). Rear shock absorbers 48 are mounted at the upper ends thereof to the upper front portions of the swing arms 47 with link mechanisms 49 extending between the lower ends of the rear shock absorbers 48 and the lower ends of the main pipes 32, 32.

A range shown by G represents a length to the position in the vicinity of the mating surface between a cylinder 44 and a crankcase 28 in a side view. The lengths of the down tube or frame 35 in the direction widthwise of the vehicle body may be reduced while maintaining the strength of an engine hanger portion including the joint member 72 and the cylindrical member 76.

In the FIG. 1, a crankcase 28 is provided together with an oil pan 29, an oil filter 37, a head cover 43 and a cylinder 44.

Figure 2:
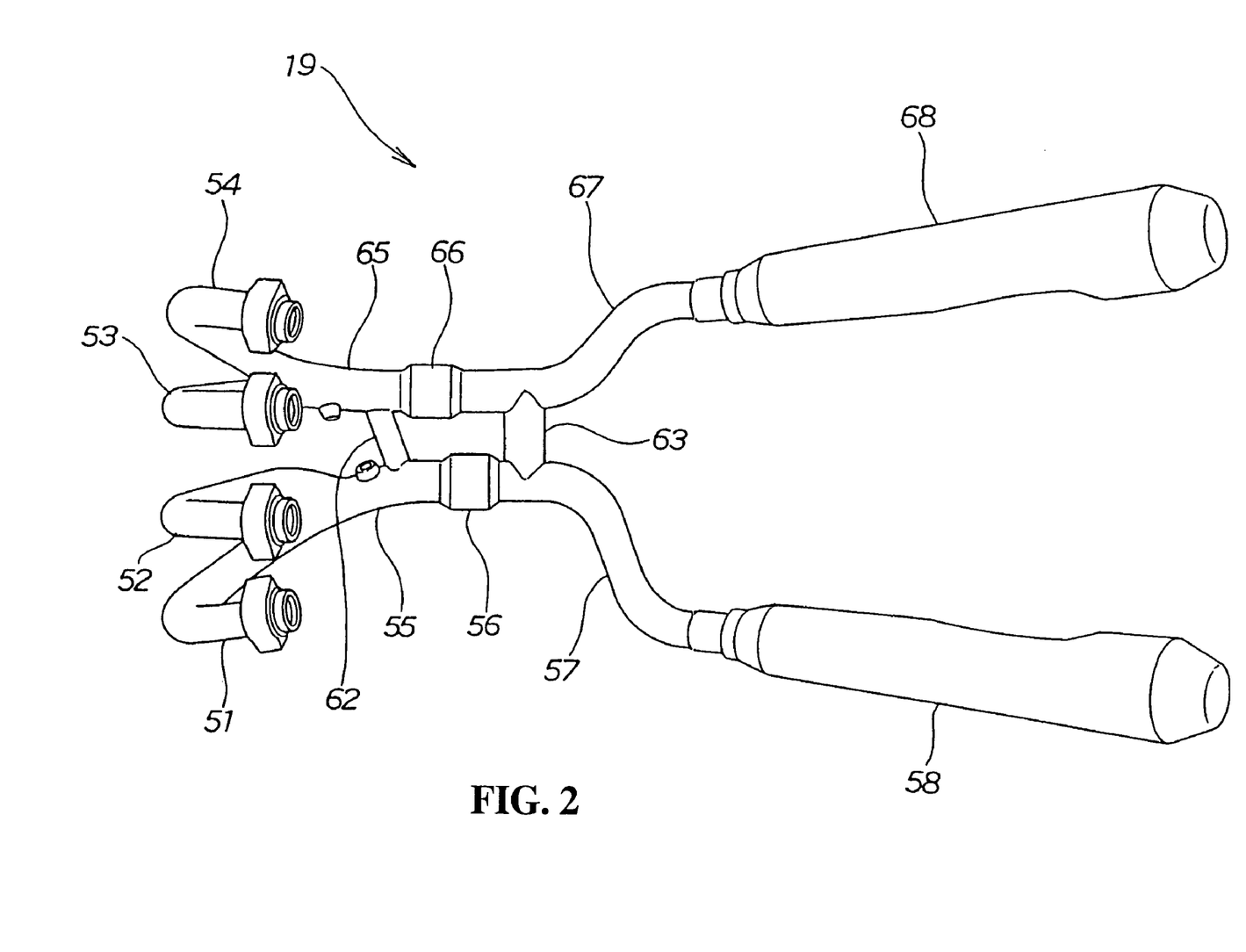
FIG. 2 is a plan view of an exhaust unit for the motorcycle in which the vehicle body structure of the present invention is employed.

FIG. 2 is a plan view of the exhaust unit for the motorcycle in which the vehicle body structure of the present invention is employed. The exhaust unit 19 is for an in-line four-cylinder engine including a first exhaust pipe 51, a second exhaust pipe 52, a third exhaust pipe 53 and a fourth exhaust pipe 54 to be mounted to the cylinder head 45 (See FIG. 1) at each cylinder. A left collective pipe 55 is connected to the first exhaust pipe 51 and the second exhaust pipe 52 with a left catalyst mounting pipe 56 being connected to the rear end of the left collective pipe 55. A left rear exhaust pipe 57 is attached to the rear end of the left catalyst mounting pipe 56 with a left muffler 58 being connected to the rear end of the left rear exhaust pipe 57. A right collective pipe 65 is connected to the third exhaust pipe 53 and the fourth exhaust pipe 54 with a right catalyst mounting pipe 66 connected to the rear end of the right collective pipe 65. A right rear exhaust pipe 67 is connected to the rear end of the right catalyst mounting pipe 66 with a right muffler 68 mounted to the rear end of the right rear exhaust pipe 67. A front communicating pipe 62 is provided for communicating the aforementioned left collective pipe 55 and the right collective pipe 65. In addition, a rear communicating pipe 63 is provided for communicating the left rear exhaust pipe 57 and the right rear exhaust pipe 67.

Figure 3:
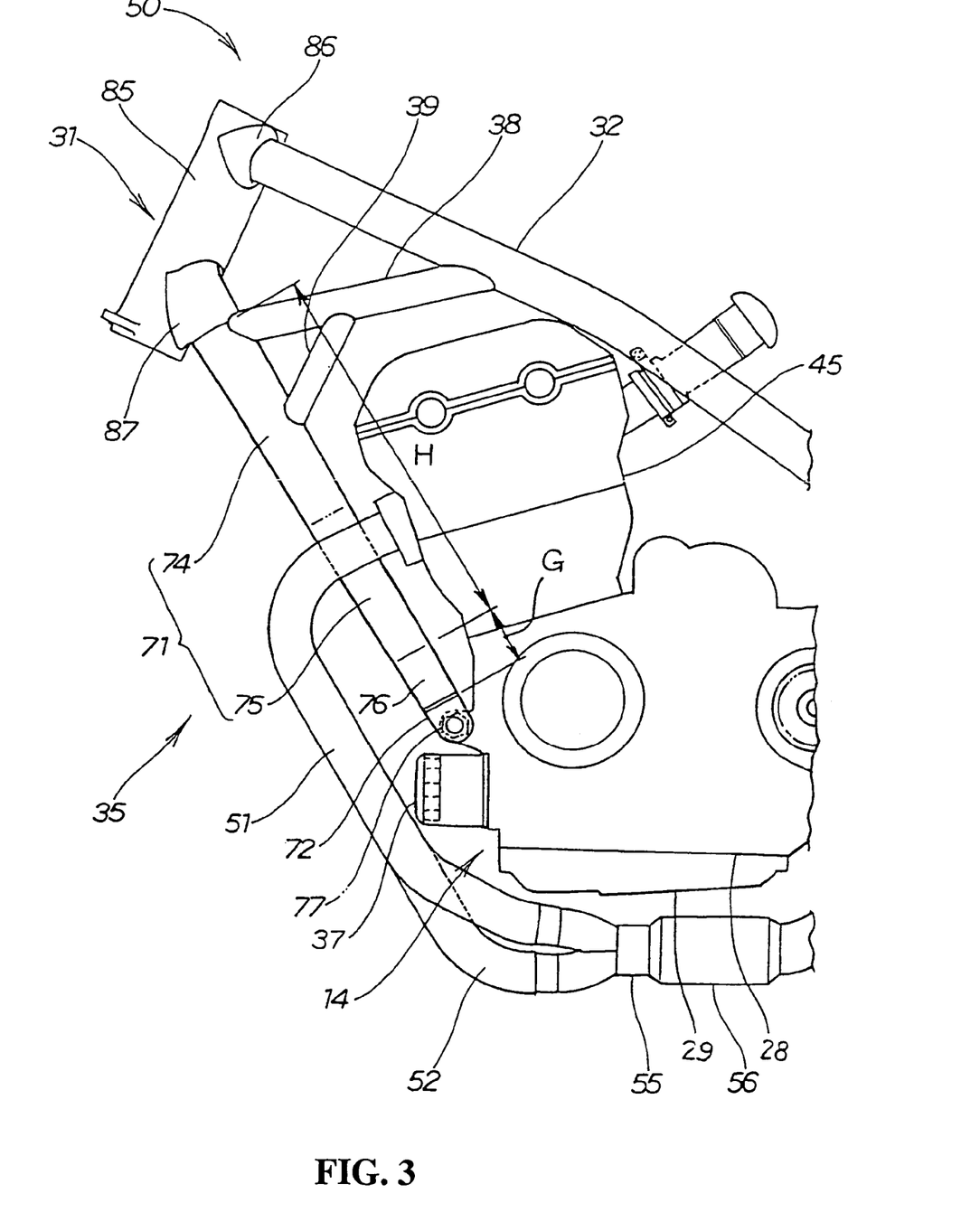
FIG. 3 is a side view of a principal portion of the vehicle body structure for the motorcycle according to the present invention.

FIG. 3 is a side view of a principal portion of the vehicle body structure for the motorcycle according to the present invention. The left down tube 35 includes a tube body 71 extending from the head pipe 31 and the joint member 72 attached to the extremity of the tube body 71.

The tube body 71 is a member formed so as to be tapered from the head pipe 31 toward the engine 14 in side view, when viewed from the side of the vehicle body, including a larger diameter portion 74 formed by expanding a pipe member of predetermined dimensions and a smaller diameter portion 75 formed by contracting the pipe member of the predetermined dimensions. The smaller diameter portion 75 includes the cylindrical member 76 formed by reducing the diameter of the pipe member while maintaining the cylindrical shape.

A vehicle body structure 50 for a motorcycle according to the present invention is provided together with a bolt 77 for fixing the engine 14 to the down tube 35.

A range shown by H is a fore-and-aft elongated portion. The range shown by G may be extended to the position in the vicinity of the first exhaust pipe 51. Accordingly, the strength of the engine hanger portion including the joint member 72 and the cylindrical member 76 may further be improved.

Figure 4:
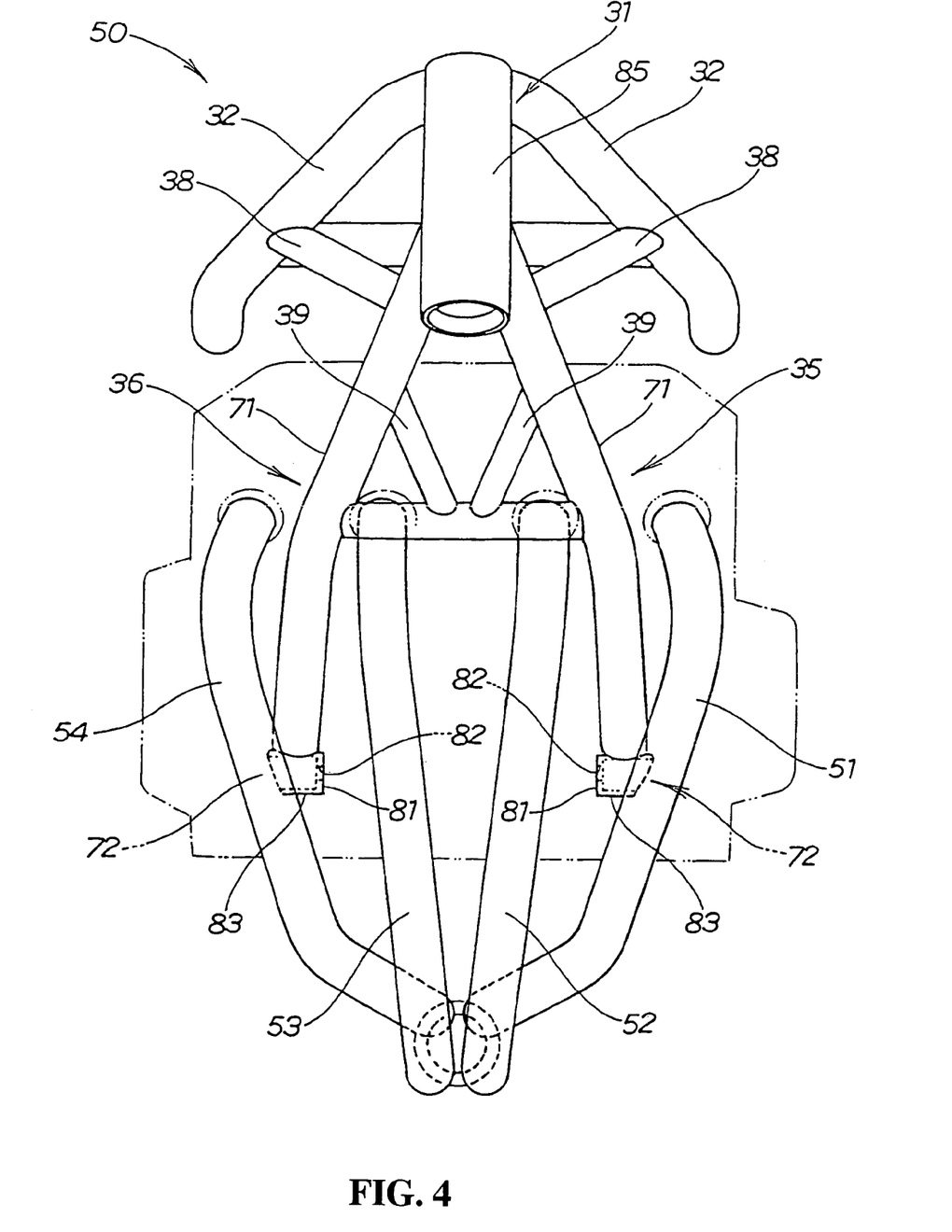
FIG. 4 is a front view of the vehicle body structure for the motorcycle according to the present invention.

FIG. 4 is a front view of the vehicle body structure for the motorcycle according to the present invention showing that the tube body 71 is formed to be constant in width from the head pipe 31 to the engine 14, when viewed from the front of the vehicle body.

The joint members 72 include mounting seat portions 81 for mounting the engine 14, formed on the down tubes 35 on the planes widthwise inside the vehicle so as to be substantially flush therewith, through-holes 82 for allowing bolts 77 for fixing the engine 14 to pass therethrough by being formed on the mounting seat portions 81 and substantially cylindrical shaped protecting members 83 for surrounding the bolts 77 by extending from the mounting seat portions 81 outwardly in the direction of the width of the vehicle.

The right down tube 36 is a symmetrical member with the left down tube 35 with respect to the center of the vehicle body.

FIG. 4 illustrates that the motorcycle 10 (See FIG. 1) is configured in such a manner that the first exhaust pipe 51 passes outside of the left down tube 35 and extends rearwardly of the vehicle body. The second exhaust pipe 52 and the third exhaust pipe 53 pass between the left and right down tubes 35, 36 rearwardly of the vehicle body and the fourth exhaust pipe 54 passes outside the right down tube 36 and extends rearwardly of the vehicle body.

The vehicle body structure 50 of a motorcycle can be said to have a configuration such that the plurality of, the first to the fourth, exhaust pipes 51–54 are disposed inside and outside the left and right down tubes 35, 36 respectively when viewed from the front of the vehicle body.

For example, it is preferable if the limit of the layout of the exhaust pipes is eliminated because variability in layout of the exhaust pipes may be increased.

Accordingly, by arranging the plurality of, the first to the fourth, exhaust pipes 51–54 inside and outside the left and right down tubes 35, 36 when viewed from the front of the vehicle body, increase in the widthwise dimension of the vehicle body and may be restrained. Thus, the layout of the first to the fourth exhaust pipes 51–54 can be facilitated. As a consequence, flexibility in the layout of the first to the fourth exhaust pipes 51–54 may be increased.

Figure 5:
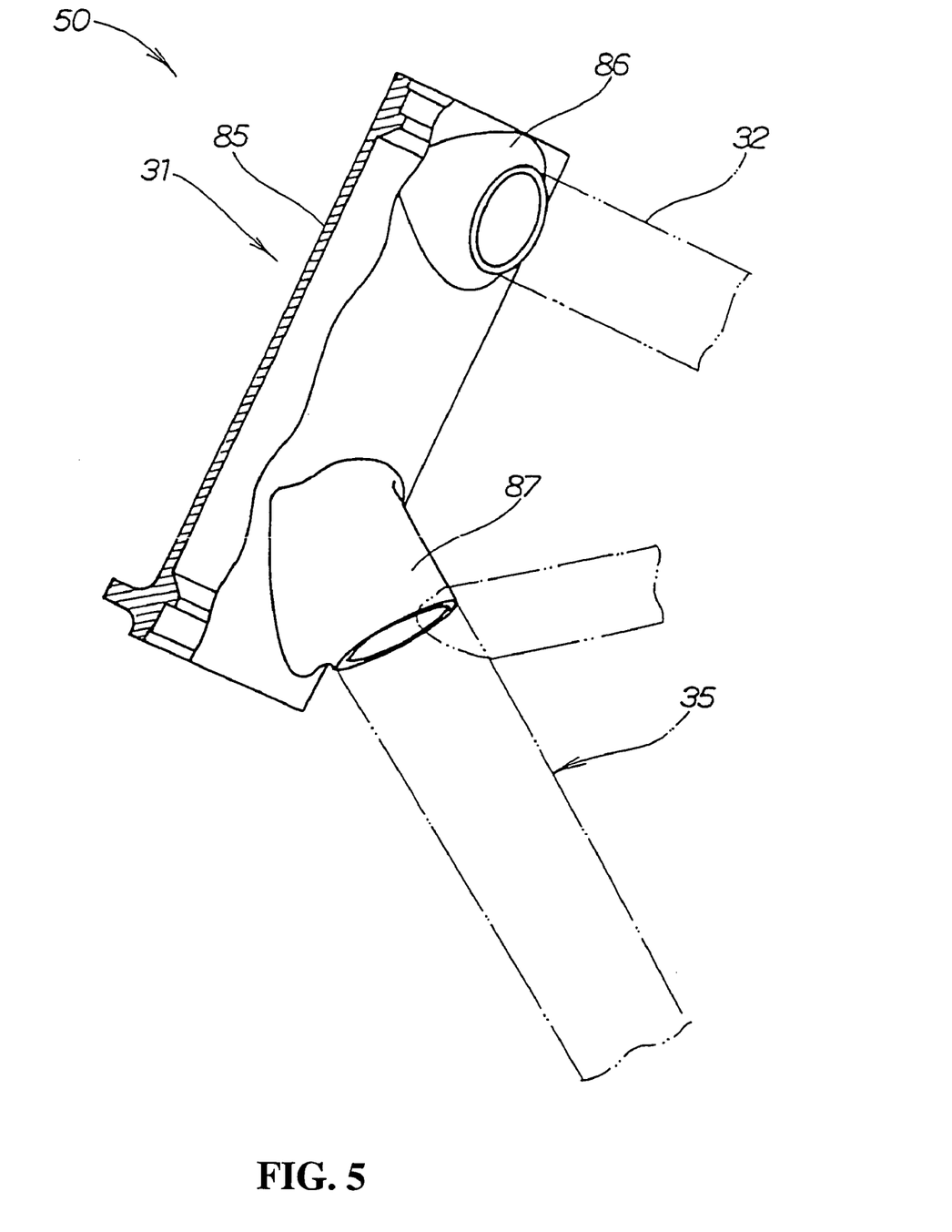
FIG. 5 is a side view of a head pipe of the vehicle body structure for the motorcycle according to the present invention.

FIG. 5 is a side view of the head pipe of the vehicle body structure for the motorcycle according to the present invention. The head pipe 31 includes a cylindrical main body 85, main pipe connecting members 86, 86 (the numeral 86 on the far side is not shown) as part of the main pipes to be connected to the left and right main pipes 32, 32 (the numeral 32 on the far side is not shown) and down tube connecting members 87, 88 (the numeral 88 on the far side is not shown) as part of the down tube to be connected to the left and right down tubes 35, 36 (the numeral 36 on the far side is not shown).

The vehicle body structure 50 for a motorcycle can be said to have a configuration such that the main pipe connecting members, part of the main pipes, 86, 86 and the down tube connecting members 87, 88, part of the down tubes, are formed integrally with the head pipe 31.

In other words, by forming the main pipe connecting members 86, 86 and the down tube connecting members 87, 88 integrally with the head pipe 31, workability in welding of the main pipes 32, 32 and the down tubes 35, 36 with respect to the head pipe 31 may be improved.

FIGS. 6(a) to (e) are explanatory drawings showing the detailed shape of the down tube of the vehicle body structure for the motorcycle in side view according to the present invention.

Figures 6A, 6B, 6C, 6D, 6E:
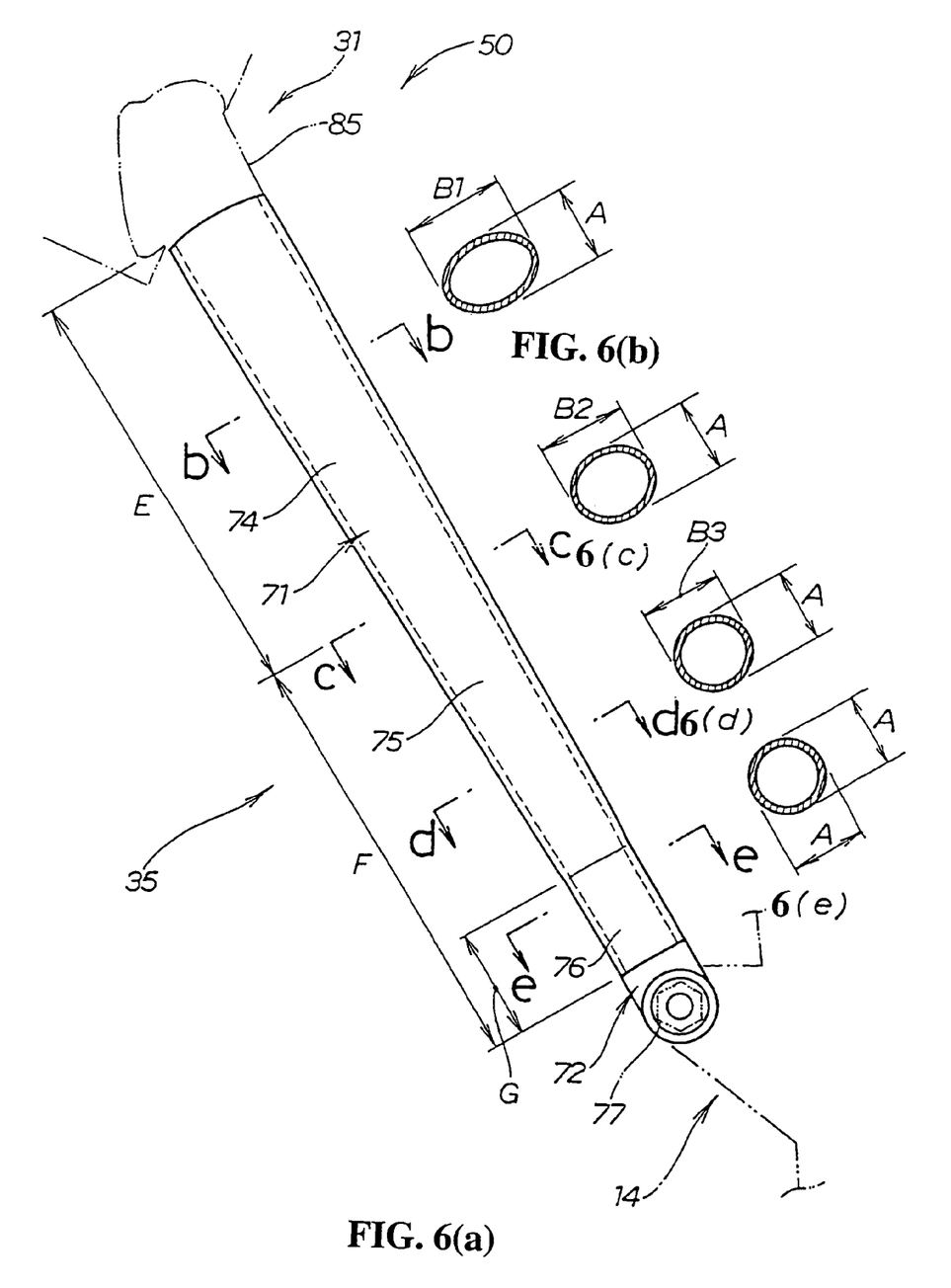
FIGS. 6(a) to 6(e) show explanatory drawings illustrating the detailed shape of a down tube of the vehicle body structure for the motorcycle in side view according to the present invention.

FIG. 6(a) is a side view of the down tube 35.

FIG. 6(b) is a cross-sectional view taken along the line b—b in FIG. 6(a), in which the cross-sectional shape of the down tube 35 exhibits an oval pipe shape. Here, the longitudinal dimension of the oval pipe is represented by B1 and the brachyaxial dimension of the oval pipe is represented by A.

FIG. 6(c) is a cross-sectional view taken along the line c—c in FIG. 6(a), in which the cross-sectional shape of the down tube 35 exhibits an oval pipe shape. Here, the longitudinal dimension of the oval pipe is represented by B2, and the brachyaxial dimension of the oval pipe is represented by A. In other words, the longitudinal dimension B2 is shorter than the longitudinal dimension B1 of the oval pipe shown in FIG. 6(b) (B2<B1) and the brachyaxial dimension A is equal to the brachyaxial dimension A of the oval pipe shown in (b).

FIG. 6(d) is a cross-sectional view taken along the line d—d in FIG. 6(a), in which the cross-sectional shape of the down tube 35 exhibits an oval pipe shape. Here, the longitudinal dimension of the oval pipe is represented by B3, and the brachyaxial dimension of the oval pipe is represented by A. In other words, the longitudinal dimension B3 is shorter than the longitudinal dimension B2 of the oval pipe shown in FIG. 6(c) (B3<B2) and the brachyaxial dimension A is equal to the brachyaxial dimension A of the oval pipe shown in FIG. 6(c).

FIG. 6(e) is a cross-sectional view taken along the line e—e in FIG. 6(a), in which the cross-sectional shape of the down tube 35 exhibits an almost complete round pipe shape. In other words, the dimension, outer dimension, A, which corresponds to the longitudinal dimension, is shorter than the longitudinal dimension B3 of the oval pipe shown in FIG. 6(d) (A<B3), and the dimension which corresponds to the brachyaxial dimension, outer dimension, A is equal to the brachyaxial dimension A of the oval pipe shown in FIG. 6(d).

In other words, the vehicle body structure 50 for a motorcycle can be said to be configured in such a manner that, in the motorcycle 10 (See FIG. 1) including the main pipes 32, 32 (See FIG. 1) extending from the head pipe 31, the pair of left and right down tubes 35, 36 (the down tube 36 on the far side is not shown) extend rearwardly from the head pipe 31 and obliquely downwardly. The engine 14 is supported by the extremities of the down tubes 35, 36 and the main pipes 32, 32, and the plurality of, the first to the fourth, exhaust pipes 51–54 shown in FIG. 4 extend from the engine 14. The down tubes 35, 36 are formed to be tapered from the head pipe 31 towards the engine 14 when viewed from the side of the vehicle body and to be constant in width from the head pipe 31 to the engine 14 when viewed from the front of the vehicle body as shown in FIG. 4.

For example, it is preferable if the rigidity of the vehicle body for a motorcycle can be improved without increasing the width of the vehicle, or if rigidity of the vehicle body for a motorcycle can be improved without increasing the weight of the vehicle body, since the dimension or the weight of the motorcycle can be maintained.

Therefore, by forming the down tubes 35, 36 so as to be tapered from the head pipe 31 toward the engine 14 when viewed from the side of the vehicle body, and to be constant in width from the head pipe 31 to the engine 14 when viewed from the front of the vehicle body, the rigidity of the vehicle body in the longitudinal direction may be improved without causing an increase in width of the vehicle and without increasing the weight of the vehicle body.

The vehicle body structure 50 for a motorcycle can be said to be configured such that the down tube 35 includes the larger diameter portion 74 which is increased in diameter by applying pressure from the inside and the smaller diameter portion 75 which is reduced in diameter by applying negative pressure. A range E represents the range of the larger diameter portion 74, a range F represents the range of the smaller diameter portion 75, and the range G represents the range of the cylindrical member 76.

In other words, since the down tube 35 includes a larger diameter portion 74 which is increased in diameter by applying pressure from the inside and a smaller diameter portion 75 which is reduced in diameter by working the same through from the outside while applying negative pressure, the down tube 35 may be formed in a relatively uniform thickness.

Figures 7A, 7B, 7C, 7D, 7E:
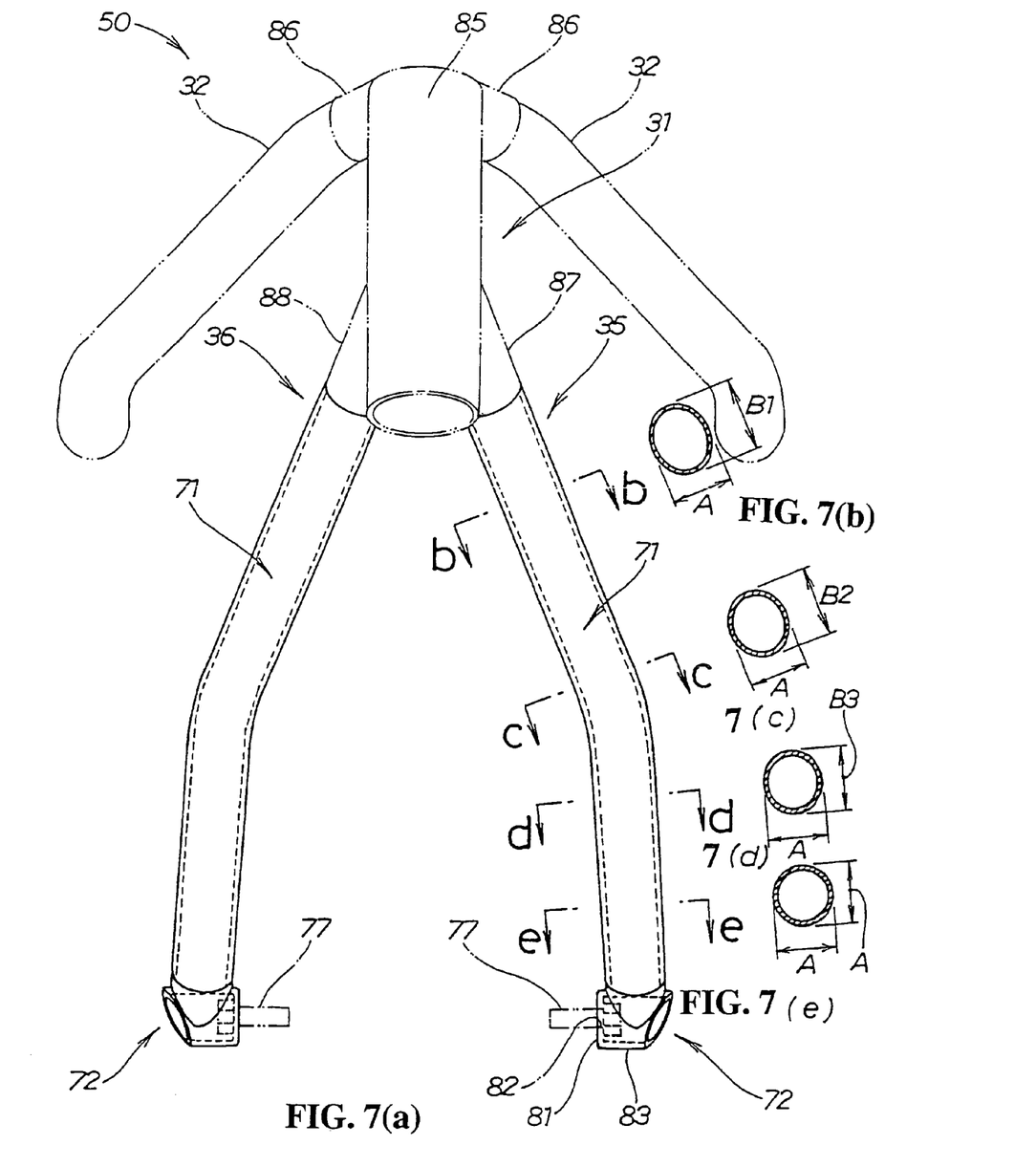
FIGS. 7(a) to 7(e) show explanatory drawings illustrating the detailed shape of the down tube of the vehicle body structure for the motorcycle according to the present invention when viewed from the front.

FIG. 7(a) to FIG. 7(e) are explanatory drawings showing the detailed shape of the down tube of the vehicle body structure for the motorcycle according to the present invention when viewed from the front. FIG. 7(a) is a front view of the down tubes 35, 36. FIG. 7(b) is a cross-sectional view taken along the line b—b in FIG. 7(a). FIG. 7(c) is a cross-sectional view taken along the line c—c in FIG. 7(a). FIG. 7(d) is a cross-sectional view taken along the line d—d in FIG. 7(a). FIG. 7(e) is a cross-sectional view taken along the line e—e in FIG. 7(a). The positions of the cross-section shown in FIG. 7(b) to FIG. 7(e) are the same as the positions of the cross-section shown in FIG. 6(b) to FIG. 6(e).

In other words, in FIG. 7(c), the longitudinal dimension B2 is shorter than the longitudinal dimension B1 of the oval pipe shown in FIG. 7(b) (B2<B1), and the brachyaxial dimension A is equal to the brachyaxial dimension A of the oval pipe shown in FIG. 7(b).

In FIG. 7(d), the longitudinal dimension B3 is shorter than the longitudinal dimension B2 of the oval pipe shown in FIG. 7(c) (B3<B2), and the brachyaxial dimension A is equal to the brachyaxial dimension A of the oval pipe shown in FIG. 7(c).

It is shown that the dimension (outer dimension) A which corresponds to the longitudinal dimension in FIG. 7(e) is shorter than the longitudinal dimension B3 of the oval pipe shown in FIG. 7(d). In addition, the dimension (outer dimension) A which corresponds to the brachyaxial dimension is equal to the brachyaxial dimension A of the oval pipe shown in FIG. 7(d).

The vehicle body structure 50 for a motorcycle can be said to be configured in such a manner that the down tubes 35, 36 include the joint members 72, 72 for mounting the engine 14 (See FIG. 1) separately formed at the extremities thereof and the joint members 72, 72 include the mounting seat portions 81 for mounting the engine 14 formed widthwise insides the down tube 35 on planes substantially flush therewith. The through-holes 82 for allowing the bolts 77 for fixing the engine 14 to pass therethrough are formed on the mounting seat portions 81. The substantially cylindrical shaped protecting members 83 for surrounding the bolts 77 extend outwardly from the mounting seat portions 81 in the direction widthwise of the vehicle.

In other words, the joint members 72 include the mounting seat portions 81 for mounting the engine 14 formed widthwise insides the down tube 35 on planes substantially flush therewith. The through-holes 82 for allowing the bolts 77 for fixing the engine 14 to pass therethrough are formed on the mounting seat portions 81 with the substantially cylindrical shaped protecting members 83 surrounding the bolts 77 extending widthwise outwardly from the mounting seat portions 81. Thus, the projection of the bolts 77 widthwise of the vehicle may be prevented. In addition, the bolts 77 are covered by the substantially cylindrical shaped protecting members 83. Consequently, an improvement in the appearance of the motorcycle is achieved.

Also, according to the vehicle body structure 50 for a motorcycle, since the bolts 77, 77 do not project widthwise of the vehicle, the width of the motorcycle may be reduced.

According to the vehicle body structure for the motorcycle according to the present invention, although there are disposed four, the first to the fourth, exhaust pipes 51–54 around the down tubes 35, 36 as shown in FIG. 4, it is not limited thereto. The number of the exhaust pipes may be from 1 to 3, or may be 5 or more.

According to the vehicle body structure for the motorcycle according to the present invention, although the main pipe connecting members 86, 86 and the down tube connecting members 87, 88 as shown in FIG. 5 are formed, it is not limited thereto. It is also possible to employ connecting members wherein only one of the main pipe connecting member or the down tube connecting member is formed.

The vehicle body structure for a motorcycle according to the present invention is suitable to be employed in a motorcycle in which a multi-cylinder engine is mounted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle comprising:
   main pipes extending rearwardly from a head pipe;
   a pair of left and right down tubes extending obliquely downwardly from the head pipe;
   an engine supported by extremities of the down tubes and the main pipes;
   a plurality of exhaust pipes extending from the engine; and
   a vehicle body structure includes the down tubes being formed to be continuously tapered at a constant taper rate from the head pipe towards the engine when viewed from a side of the vehicle body and to be constant in width from the head pipe towards the engine when viewed from a front of the vehicle body,
   wherein a cross section of upper portions of said down tubes comprises a continuous rounded oval shape and a cross section of lower portions of said down tubes comprises a circular shape.

2. The motorcycle according to claim 1, wherein the plurality of exhaust pipes are disposed respectively inside and outside the left and right down tubes when viewed from the front of the vehicle body.

3. The motorcycle according to claim 1, wherein the down tubes comprise joint members for mounting the engine, said joint members being separately formed at the extremities thereof and the joint members comprise mounting seat portions for mounting the engine, the mounting seat portions being formed on the down tubes on planes widthwise inside the vehicle so as to be substantially flush therewith, through-holes for allowing bolts for fixing the engine to pass therethrough by being formed on the mounting seat portions and substantially cylindrical shaped protecting members for surrounding the bolts by extending from the mounting seat portions outwardly in the widthwise direction of the vehicle body structure.

4. The motorcycle according to claim 1, wherein the down tubes include larger diameter portions which are increased in diameter by applying pressure from an inside of the down tubes and smaller diameter portions which are reduced in diameter by applying negative pressure.

5. The motorcycle according to claim 1, wherein part of the main pipes and/or the down tubes is/are formed integrally with the head pipe.

6. The motorcycle according to claim 1, wherein at least one of said plurality of exhaust pipes traverses at least one of said down tubes at a reduced tapered section of said at least one of said down tubes.

7. The motorcycle according to claim 1, wherein edges of the down tubes when viewed from the side of the vehicle body are straight lines.

8. A vehicle body for a motorcycle comprising:
   main pipes extending rearwardly from a head pipe; and
   a pair of left and right down tubes extending obliquely downwardly from the head pipe;
   said down tubes being formed to be continuously tapered at a constant taper rate from the head pipe towards an engine when viewed from a side of the vehicle body and to be constant in width from the head pipe towards an engine when viewed from a front of the vehicle body,
   wherein a cross section of upper portions of said down tubes comprises a continuous rounded oval shape and a cross section of lower portions of said down tubes comprises a circular shape.

9. The vehicle body for a motorcycle according to claim 8, wherein a plurality of exhaust pipes are disposed respectively inside and outside the left and right down tubes when viewed from the front of the vehicle body.

10. The vehicle body for a motorcycle according to claim 8, wherein the down tubes comprise joint members for mounting an engine, said joint members being separately formed at extremities thereof and the joint members comprise mounting seat portions for mounting the engine, the mounting seat portions being formed on the down tubes on planes widthwise inside the vehicle so as to be substantially flush therewith, through-holes for allowing bolts for fixing the engine to pass therethrough by being formed on the mounting seat portions and substantially cylindrical shaped protecting members for surrounding the bolts by extending from the mounting seat portions outwardly in the widthwise direction of the vehicle body structure.

11. The vehicle body for a motorcycle according to claim 8, wherein the down tubes include larger diameter portions which are increased in diameter by applying pressure from an inside of the down tubes and smaller diameter portions which are reduced in diameter by applying negative pressure.

12. The vehicle body for a motorcycle according to claim 8, wherein part of the main pipes and/or the down tubes is/are formed integrally with the head pipe.

13. The vehicle body for a motorcycle according to claim 8, wherein at least exhaust pipe traverses at least one of said down tubes at a reduced tapered section of said at least one of said down tubes.

14. The vehicle body for a motorcycle according to claim 8, wherein edges of the down tubes when viewed from the side of the vehicle body are straight lines.

15. A vehicle body for a motorcycle comprising:
a head pipe;
main pipes extending rearwardly from said head pipe; and
a pair of left and right down tubes extending obliquely downwardly from the head pipe;
said down tubes being formed to be continuously tapered at a constant taper rate to be larger in cross-section adjacent to the head pipe and to be smaller in cross-section at a distal end thereof when viewed from a side of the vehicle body, said down tubes being constant in width from the head pipe towards the distal end of the down tubes when viewed from a front of the vehicle body,
wherein a cross section of upper portions of said down tubes comprises a continuous rounded oval shape and a cross section of lower portions of said down tubes comprises a circular shape.

16. The vehicle body for a motorcycle according to claim 15, wherein a plurality of exhaust pipes are disposed respectively inside and outside the left and right down tubes when viewed from the front of the vehicle body.

17. The vehicle body for a motorcycle according to claim 15, wherein the down tubes comprise joint members for mounting an engine, said joint members being separately formed at extremities thereof and the joint members comprise mounting seat portions for mounting the engine, the mounting seat portions being formed on the down tubes on planes widthwise inside the vehicle so as to be substantially flush therewith, through-holes for allowing bolts for fixing the engine to pass therethrough by being formed on the mounting seat portions and substantially cylindrical shaped protecting members for surrounding the bolts by extending from the mounting seat portions outwardly in the widthwise direction of the vehicle body structure.

18. The vehicle body for a motorcycle according to claim 15, wherein the down tubes include larger diameter portions which are increased in diameter by applying pressure from an inside of the down tubes and smaller diameter portions which are reduced in diameter by applying negative pressure.

19. The vehicle body for a motorcycle according to claim 15, wherein part of the main pipes and/or the down tubes is/are formed integrally with the head pipe.

20. The vehicle body for a motorcycle according to claim 15, wherein edges of the down tubes when viewed from the side of the vehicle body are straight lines.

21. A vehicle body for a motorcycle comprising:
main pipes extending rearwardly from a head pipe; and
a pair of left and right down tubes extending obliquely downwardly from the head pipe;
said down tubes being formed to be tapered at a constant taper rate from the head pipe towards an engine when viewed from a side of the vehicle body and to be constant in width from the head pipe towards an engine when viewed from a front of the vehicle body,
wherein the down tubes taper from a substantially oval cross-sectional shape from the head pipe to a substantially round cross-sectional shape at a distal end thereof, and
wherein a cross section of upper portions of said down tubes comprises a continuous rounded oval shape and a cross section of lower portions of said down tubes comprises a circular shape.

22. The vehicle body for a motorcycle according to claim 21, wherein a longitudinal dimension of the down tubes continuously decreases from the oval cross-sectional shape to the round cross-sectional shape and a brachyaxial dimension of the down tubes is constant.

23. The vehicle body for a motorcycle according to claim 21, wherein a plurality of exhaust pipes are disposed respectively inside and outside the left and right down tubes when viewed from the front of the vehicle body.

24. The vehicle body for a motorcycle according to claim 21, wherein edges of the down tubes when viewed from the side of the vehicle body are straight lines.

* * * * *